United States Patent [19]

Schwartz

[11] 3,733,454
[45] May 15, 1973

[54] OSCILLATOR TUBE FILAMENT CIRCUIT FOR HIGH FREQUENCY WELDING GENERATOR

[75] Inventor: William R. Schwartz, Granite City, Ill.

[73] Assignee: Olin Corporation, New Haven, Conn.

[22] Filed: Feb. 17, 1972

[21] Appl. No.: 227,179

[52] U.S. Cl..............................219/8.5, 219/10.75
[51] Int. Cl..............................................H05b 5/02
[58] Field of Search......................219/10.75, 10.77, 219/8.5, 59

[56] References Cited

UNITED STATES PATENTS

| 3,037,105 | 5/1962 | Kohler | 219/8.5 |
|---|---|---|---|
| 3,131,285 | 4/1954 | Kohler et al. | 219/8.5 X |
| 3,066,210 | 11/1962 | Goetter et al. | 219/10.75 X |
| 2,540,275 | 2/1951 | Mittlemann | 219/10.75 X |
| 2,693,537 | 11/1954 | Kinn | 219/10.75 X |
| 3,448,407 | 6/1969 | Lankaeijea | 219/10.77 X |
| 2,971,167 | 2/1961 | Blok et al. | 219/10.77 X |
| 2,554,087 | 5/1951 | Breimer | 219/10.75 X |

*Primary Examiner*—Thomas J. Kozma
*Assistant Examiner*—B. A. Reynolds
*Attorney*—Robert H. Bachman et al.

[57] ABSTRACT

A high frequency welding apparatus for obtaining consistently high quality welds in metals, particularly those having low magnetic permeabilities and high thermal conductivities. The filament supply to the oscillator tube or tubes of the current generator has been changed from an A-C supply to a D-C supply having a low ripple or no ripple at all. The output stability of the current generator is thereby improved by decreasing the ripple on the output current to less than 6 percent.

7 Claims, 3 Drawing Figures

PRIOR ART

OSCILLATOR TUBE FILAMENT CIRCUIT FOR HIGH FREQUENCY WELDING GENERATOR

BACKGROUND OF THE INVENTION

In the art of welding metal strip into tubing, it is known to use high frequency induction welding. Typical examples of prior art high frequency welding apparatuses and processes are set out in U.S. Pat. Nos. 3,037,105, granted May 29, 1962; 2,794,108, granted May 28, 1957; and 2,818,488, granted Dec. 31, 1957.

High frequency currents which are used to heat the strip edges to welding temperature are generally obtained by means of conventional high frequency current generators. Commercially available high frequency current generators have sufficient output stability for welding most common metals such as steel.

In welding copper and copper base alloys, however, particularly copper and copper base alloys having a liquidus to solidus temperature range which is comparatively narrow, it has been found in accordance with this invention that conventional high frequency current generators do not possess sufficient output stability at the power levels required to provide consistently high quality welds. When welding these metals or any non-magnetic metal having high thermal conductivity, it is necessary to operate at higher power levels than would be required for welding a metal such as steel.

The stability of the output current from the high frequency generator is a major factor in the control of the weld quality and any instability in the output can cause poor weld quality and particularly undesirable variations in weld quality along the longitudinal length of the weld seam.

The output of a conventional high frequency current generator comprises an oscillating current of a specified frequency inside an envelope of a lower frequency which comprises a ripple on the high frequency current. This ripple may be as much as 8 percent of the magnitude of the output current. This lower frequency ripple on the high frequency output of the generator has been found to be a composite ripple formed by the interaction of more than one lower frequency ripple source of differing frequencies, which are generally in phase with each other. The problem is particularly acute where the lower frequency sources which cause the composite ripple are out of phase. In such a case, it has been found that the magnitude of the ripple depending on the additive and subtractive effects of the lower frequency ripple can increase at various times to as much as 14 percent.

SUMMARY OF THE INVENTION

In accordance with this invention, it has been found that these lower frequency ripples substantially derive from the high voltage D-C power supply and from the oscillator tube filament supply of the generator. In conventional high frequency current generators, the oscillator tube filament is heated by an A-C current source or filament supply of low frequency generally about 60 Hz. This current produces a 60 Hz. voltage gradient along the length of the filament which results in a corresponding gradient along its length in the magnitude of the electron flow from the filament. This causes the output of the oscillator tube to vary in that it includes a low frequency ripple component which is derived from the filament supply.

The interaction of this low frequency ripple component derived from the filament supply with the ripple component on the high voltage D-C signal which is applied to the plate of the oscillator tube and which derives from the high voltage D-C power supply causes through the aforenoted additive and subtractive effects a composite lower frequency ripple on the high frequency output current which can exceed 14 percent at various times.

In accordance with this invention, this problem has been eliminated by changing the oscillator tube filament supply from A-C to D-C having a ripple less than 20 percent.

It is also possible in accordance with this invention to change the filament supply to pure D-C derived from a battery type source. However, because of the expense of such an approach, it is preferred in accordance with this invention to provide rectification and filtering of the normal A-C filament supply so that it will comprise a D-C source having a low ripple. The rectification and filtering of the A-C filament supply are accomplished by means of conventional circuitry as will be described hereinafter.

It is accordingly an object of this invention to provide a high frequency current generator having improved output stability for use in welding metals, particularly for use in welding metal strip into tubing.

It is another object of this invention to provide a high frequency generator as above wherein the output of the filament supply for the oscillator tube or tubes comprises a low ripple D-C voltage and current having a ripple of less than 20 percent and preferably less than 10 percent.

It is a further object of this invention to provide a high frequency welding apparatus for welding metal or metals wherein the high frequency current generator which provides the current for heating the metal or metals to the welding temperature has improved output stability.

It is a further object of this invention to provide a welding apparatus as above wherein the output of the filament supply for the oscillator tube or tubes in the high frequency generator comprises a low ripple D-C voltage and current having a ripple of less than 20 percent and preferably less than 10 percent.

Other objects and advantages will become apparent from the following description and drawings.

DESCRIPTION OF THE PREFERRED EMBODIMENTS

Figure 1:
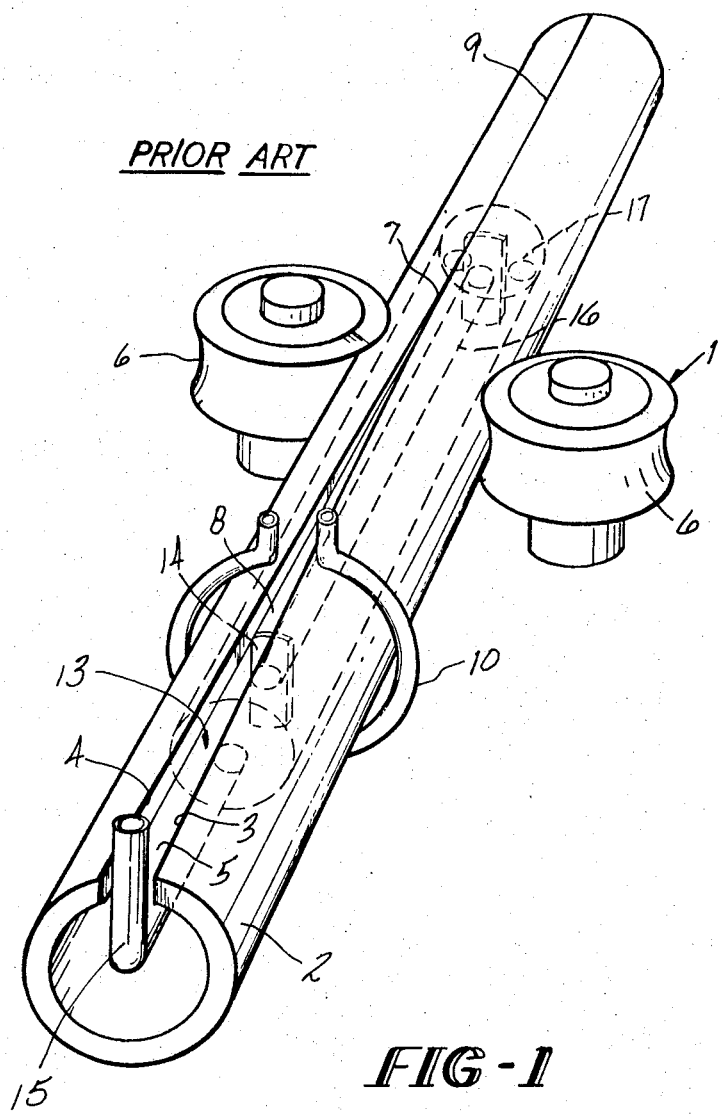
FIG. 1 is a schematic view of a typical prior art high frequency welding apparatus.

Referring now to the drawings and especially to FIG. 1, there is illustrated a typical welding apparatus 1 for welding metal strip in the form of a preformed open tube 2 into tubing. The apparatus is adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known design. The forming mill may contain a plurality of roll stands or dies which form metal strip into the open tube 2. It is to be understood that other roll stands may be situated in line immediately following the apparatus 1 to further form the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rollers of known form which engage opposite sides of the tube 2 and cause the longitudinally extending gap 5 therein to become closed substantially at a weld point 7 forming a "V" shaped gap 8. As the open tubing 2 advances to the weld point 7, the edges 3 and 4 at the gap 8 become welded together along the weld seam 9.

The edges 3 and 4 at the "V" shaped gap 8 are heated by means of an induction coil 10, although contacts on each side of the gap 8 could be substituted for the coil.

Figure 2:
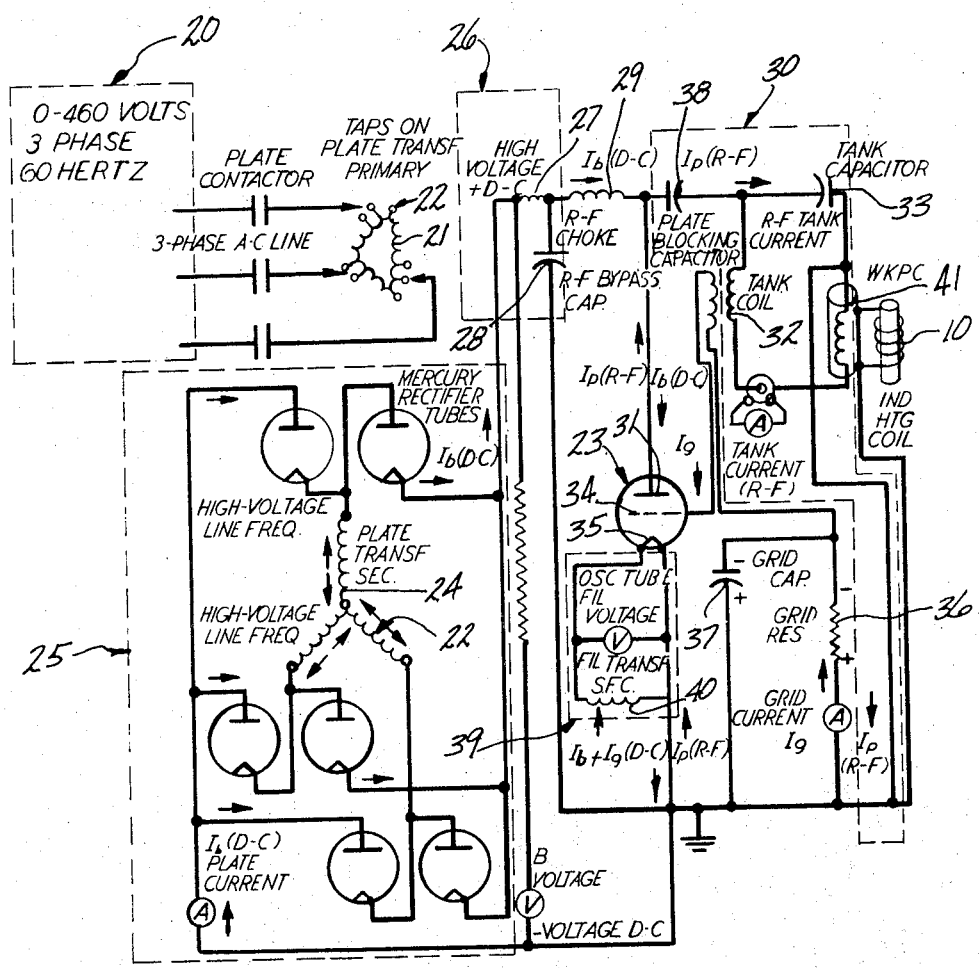
FIG. 2 is a schematic circuit diagram of a simplified conventional high frequency current generator for providing the high frequency current to the welding apparatus of FIG. 1.

The coil is electrically connected to a source of high frequency current such as shown in FIG. 2. The high frequency current is normally at least 100 kilocycles per second and, preferably, at least 400 kilocycles per second or higher. The coil is also connected to a source of cooling medium (not shown) which flows through cooling means to keep it from overheating.

The apparatus 1 may also include the following elements as shown in FIG. 1. An impeder 13 may be included to improve the efficiency of the induction coil 10 by increasing the impedance of the high frequency current paths around the back of the open tube 2. This reduces the flow of current around the back of the tube 2 and increases the flow of current along the tube edges 3 and 4 running from a point on the tube edge 3 adjacent the coil 10 to the weld point 7 and back the opposing tube edge 4 to a point adjacent the coil 10. This results in more efficient heating of the edges 3 and 4 of the open tube 2, the edges being heated up to the welding temperature upon reaching the weld point 7.

The impeder 13 may be of any suitably known construction and comprises a schroud 14 connected to a hollow supporting arm 15 as shown extending down through the gap 5. The actual shape of the schroud 14 shown in FIG. 1 is merely schematic and it may have any suitable shape.

A source of cooling medium (not shown) such as water is connected to the hollow supporting arm 15 for flowing water into the schroud 14 and about a core of magnetic material 16 which is held therein. The magnetic material in the core should be of an insulating nature to provide a core substantially free of eddy current losses. The core is preferably a sintered magnetic oxide insulating material, preferably of types now well known which have a low loss factor and high volume resistivity. A suitable material is marketed under the name "Ferramic" by General Ceramic and Steatite Corporation, the permeability thereof being substantially greater than unity. The cooling medium which passes through the hollow supporting arm 15 flows within the schroud 14 and about the Ferramic core 16 to cool the core and is generally discharged within the welded tube through holes 17.

In accordance with this invention it has been found that the output stability of conventional high frequency current generators which supply the high frequency current to the strip edges to heat them to the welding temperature is not sufficient to obtain consistently high quality welds along the entire extent of the weld seam of the tube. This is the case where the tube is formed from a metal having a low magnetic permeability less than about 5 oersteds and a high thermal conductivity. The current may be supplied to the strip edges either by the use of an induction coil as in FIG. 1 or contacts as in U.S. Pat. Nos. 2,794,108 and 2,818,488.

Copper and copper base alloys present a particularly difficult welding problem in that they have a low magnetic permeability and a high thermal conductivity. Many of these alloys are even more difficult to weld because the ranges of temperature between their liquidus and solidus points are extremely narrow.

It has been found that conventional high frequency generators include at times as much as 14 percent ripple on the output current though generally the ripple is as much as 8 percent. These ripples from the standpoint of weld quality represent instabilities in the output current of the generator which can cause severe weld defects and overall poor weld quality particularly at the higher value.

FIG. 2 shows a schematic diagram of a simplified high frequency current generator which might be used for purposes of welding metals. The circuit shown therein is meant only to be exemplary of a high frequency current generator and is not meant to be limitive of the invention. In fact, most commercial high frequency current generators have much more complicated circuitry than shown in FIG. 2; however, FIG. 2 does show the essential elements of a high frequency current generator and is sufficient to illustrate the circuit modifications in accordance with this invention which are effective to reduce the maximum percentage ripple to less than 6 percent and preferably less than 4 percent. These circuit modifications will be discussed hereinafter with reference to FIG. 3.

Referring to FIG. 2 as an example, the main power supply 20 of the high frequency current generator comprises a motor generator which is driven by a conventional 460 volt, three phase, 60 Hz. incoming power line. The main power supply 20 can provide a constant 460 volt, three phase, 60 Hz. output or may produce any desired voltage controllable from 0 to 460 volts, three phase 60 Hz. The output of the main power supply 20 is applied to the primary 21 of the plate transformer 22 which steps up the voltage in a fixed ratio to the higher voltage required for operation of the oscillator tube 23. In the generator of FIG. 2, for example, the ratio employed was 1/20 so that the output of the plate transformer 22 at its secondary 24 was 9200 volts, three phase, 60 Hz. The output of the plate transformer 22 taken off its secondary 24 is fed to a three phase full wave rectifier circuit or D-C power supply 25 which changes the A-C input to a D-C output with a residual ripple.

In accordance with this example, this residual ripple comprises 360 Hz. which is characteristic of full wave rectification from a 60 Hz. three phase supply. The output of the D-C power supply 25 is smoothed by a conventional L-section filter 26 consisting of an input filter choke 27 and bypass capacitor 28 arranged as shown which reduces the amount of ripple on the D-C output. The output of the filter 26 goes into an R-F choke 29 which prevents the R-F from the tank circuit 30 or oscillator tube 23 from being fed back to the high voltage D-C power supply 25. The D-C signal is fed from the R-F choke 29 to the plate 31 of the oscillator tube 23.

The high frequency generator of FIG. 2 shows a single oscillator tube 23; however, high frequency generators may contain a plurality of oscillator tubes which are generally connected in parallel. The oscillating section of the high frequency generator is made up of the oscillator tube 23 and a tank circuit 30 consisting of a matched inductor 32 and capacitor 33. The oscillator tube 23 controls the amount of electrical energy delivered to the tank circuit 30. The frequency of the output depends on the product of the inductance of the inductor 32 and capacitance of the capacitor 33 in the tank circuit 30. A small and proportional amount of the power in the tank circuit 30 is fed back to the control grid 34 of the oscillator tube 23 to control the current flow in the tube and thereby the amount of electrical energy entering the tank circuit 30. A heated filament 35 within the oscillator tube 33 provides the source of electron flow within the tube when the high voltage D-C output from the power supply 25 is applied to the plate 23.

In the circuit of FIG. 2, the feed back from the tank circuit 30 to the grid 34 of the oscillator tube 23 is accomplished by inductively coupling the grid to the tank circuit inductor 32. Other means for coupling the grid as are well known in the art could be employed.

During the portion of the high frequency cycle when the grid 34 is positive with respect to the filament 35, it draws current just as the plate does. In the circuit of FIG. 2, the grid current flows through a grid resistor 36 in parallel with a grid capacitor 37. The capacitive discharge across the grid resistor 36 creates the negative D-C bias which is essential to the operation of the oscillator tube. The portion of the voltage which is fed back to the control grid of the tube causes the current to swing periodically from zero to the maximum thereby providing the desired oscillation.

The R-F (450 KHz.) output of the oscillator tube 23 goes through the plate blocking capacitor 38 which passes R-F but does not allow D-C from the plate 31 to be fed into the tank circuit.

The heated filament 35 of the oscillator tube 23 in conventional current generators as exemplified by FIG. 2 is generally heated by an A-C filament supply 39 which comprises a 60 Hz. current obtained off the secondary of a filament transformer 40. This current produces a 60 Hz. voltage gradient along the length of the filament 35 and introducing a small 60 Hz. ripple component as aforenoted into the high frequency output of the tube 23 which in accordance with this example is approximately 450 KHz.

This 60 Hz. ripple though slight does combine with the 360 Hz. ripple from the D-C power supply 25 with which it is normally in phase to form a composite ripple which at times is as much as 8 percent of the magnitude of the output current of the generator. This problem can be complicated further due to minor variations in motor generator 20 behavior which cause the 60 Hz. and 360 Hz. ripples to phase in and out with each other which due to the additive and subtractive effects of the ripples result in a composite ripple representing as much as 14 percent of the output current.

These variations in motor generator 20 behavior generally comprise variations in the output frequency which in the above example might range from 58 to 62 Hz. These changes occur due to changing load conditions on the motor which in turn changes its speed and output frequency.

The output of the high frequency current generator is derived from the tank circuit 30. There are many variations as to how this may be accomplished and the one shown in FIG. 2 is merely exemplary. In the circuit of FIG. 2, the primary of an R-F output transformer 41 is in series with the tank coil 32 and the tank capacitor 33. The R-F transformer 41 serves as an impedance matching means and the secondary of the transformer provides the power to the induction coil 10 as in FIG. 1 or the contacts if they are used.

Having thus described the essential elements of a conventional high frequency current generator and welding apparatus, the ensuing description will make apparent the circuit modifications in accordance with this invention.

It has been found necessary to limit the maximum ripple on the output of the high frequency current generator to less than 6 percent and preferably less than 4 percent of the output current in order to obtain consistently high quality welds when welding metals such as copper or copper base alloys. This has been accomplished by changing the oscillator filament voltage and current from A-C to D-C having no ripple or having a low ripple generally less than 20 percent and preferably less than 10 percent. The D-C filament supply in accordance with this invention may be of any conventional design.

The complete absence of ripple can be obtained by employing a battery or a plurality of batteries in parallel which would supply the necessary filament voltage. Alternatively and preferably in accordance with this invention in view of the lesser expense and space involved, the output of the conventional filament supply 39 can be rectified to form a D-C voltage and current having a low ripple which may then be smoothed by conventional filtering means so that the ripple is within the aforenoted ranges.

Figure 3:
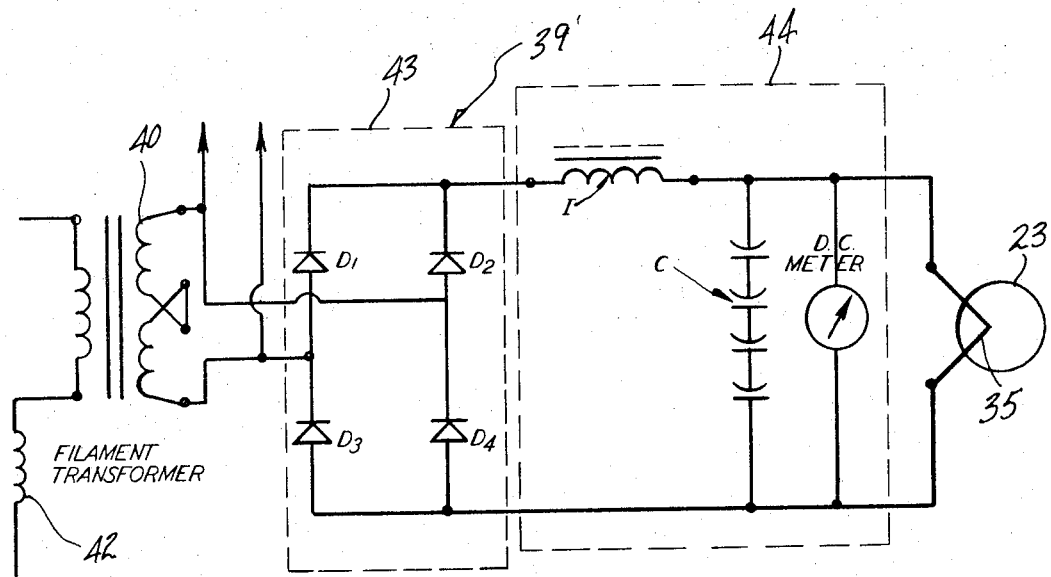
FIG. 3 is a schematic circuit diagram of an exemplary modification in accordance with this invention of the filament supply for the oscillator tube or tubes in the high frequency generator of FIG. 2.

FIG. 3 shows an exemplary circuit modification which can be applied to the filament supply 39 in the generator of FIG. 2 to obtain the desired D-C filament voltage and current having a ripple less than 20 percent and preferably less than 10 percent. In the circuit of FIG. 2 as an example, the oscillator tube filament 23 voltage had been 13 volts A-C. In accordance with this invention, the input voltage to the existing filament transformer 40 was increased.

Referring to FIG. 3 this voltage was changed from 460 volts, 60 Hz., single phase to 580 volts, 60 Hz., single phase in order to obtain a 16 volt, 60 Hz., single phase output from the secondary of the filament transformer 40. The 580 volt, 60 Hz., single phase voltage is across a saturable reactor 42 which is in series with the filament transformer 40. The saturable reactor 42 acts as a voltage regulator removing line variations from the filament transformer 40. The 16 volt, 60 Hz., single phase output of the filament transformer 40 is fed in accordance with this invention to a rectification means 43 such as the full wave bridge rectifier shown in FIG. 3. This changes the A-C filament voltage to a D-C voltage with a ripple. To reduce this ripple to within the aforenoted ranges for the output of the D-C filament supply 39', a filtering means 44 was employed, as for example, the choke input filter network of FIG. 3, which consists of an inductor I in series and a capacitor C which is in parallel with the output of the D-C filament supply 39'.

The output of the filtering means 44 is fed to the oscillator filament 36 which is in parallel with the capacitor C of the filtering means 44 as shown. The 16 volt input to the filtering means 44 is reduced to the 13 volts necessary for the oscillator filament 35 by the potential drop which occurs across the inductor I.

While FIG. 3 shows an exemplary means for obtaining a D-C filament voltage and current having a low ripple which comprises rectification means and filtering means, it is apparent that any conventional rectification means and filtering means which are known in the art to be adaptable for the purposes herein could be employed. Further, any suitable D-C supply with low ripple as aforenoted could be used as the D-C filament supply 39' in accordance with this invention, as for example, a motor driven D-C supply.

While the invention has been described with reference to welding metal strip into tube, it is broadly applicable to any known high frequency welding application, including the welding of structural shapes and dissimilar metals.

Specific values for the electrical components of the circuits of FIGS. 2 and 3 have not been set forth since they would be readily apparent to one skilled in the art and, further, since considerable variation in these values is possible.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a high frequency welding apparatus for welding copper or copper base alloys along a weld seam, said apparatus including means for applying a high frequency current to heat said copper or copper base alloys at the weld seam to the welding temperature, said current application means being electrically connected to a high frequency current generator, said generator including at least one oscillator having a plate, grid, and filament therein and an A-C filament supply for heating said filament, the improvement wherein a D-C filament supply is substituted for said A-C filament supply, said D-C filament supply comprising said A-C filament supply, means for rectifying the output of said A-C filament supply to provide a D-C voltage and current having a ripple and means for filtering the output of said rectifying means to reduce the ripple on the output to less than 20 percent of the magnitude of the filament current or voltage, whereby said high frequency current generator has a ripple on its output of less than 6 percent.

2. In a high frequency welding apparatus as in claim 1 the further improvement wherein said ripple on the output of said D-C filament supply is less than 10 percent.

3. In a high frequency welding apparatus as in claim 1 the further improvement wherein said rectifying means comprises a full wave bridge rectifier.

4. In a high frequency welding apparatus as in claim 3 the further improvement wherein said filtering means comprises a choke input filter comprising an inductor in series with the output of the rectifying means and a capacitor in parallel with the output of the rectifying means and the filament.

5. In a high frequency welding apparatus as in claim 1 the further improvement wherein said means for applying a high frequency current comprises an induction coil.

6. In a high frequency welding apparatus as in claim 5 the further improvement wherein said metal or metals are in the form of strip which is to be welded into tube.

7. In a high frequency welding apparatus as in claim 2 for further improvement wherein said high frequency current generator has a ripple on its output of less than 4 percent.

* * * * *